United States Patent [19]

Millauer

[11] 4,084,263
[45] Apr. 11, 1978

[54] KNEADING AND MIXING MACHINE

[75] Inventor: Christian Millauer, Stuttgart, Germany

[73] Assignee: Firma Werner & Pfleiderer, Stuttgart, Germany

[21] Appl. No.: 772,224

[22] Filed: Feb. 25, 1977

Related U.S. Application Data

[63] Continuation of Ser. No. 464,333, Apr. 26, 1974, abandoned.

[30] Foreign Application Priority Data

Apr. 30, 1973 Germany .......................... 2321854

[51] Int. Cl.² .............................................. B29B 1/10
[52] U.S. Cl. ..................................... 366/84; 366/291; 366/300
[58] Field of Search ................... 259/192, 6, 5, 21, 41, 259/104; 425/207, 208

[56] References Cited

U.S. PATENT DOCUMENTS

| | | | |
|---|---|---|---|
| 2,441,222 | 5/1948 | Fuller | 259/192 |
| 2,733,051 | 1/1956 | Street | 259/6 |
| 2,995,774 | 8/1961 | Pasquetti | 259/6 |
| 3,446,485 | 5/1969 | Fischer | 259/6 |
| 3,468,518 | 9/1969 | Koch | 259/6 |
| 3,490,750 | 1/1970 | Brennal | 259/6 |
| 3,550,914 | 12/1970 | Matsuoka | 259/104 |
| 3,608,868 | 9/1971 | Koch | 259/6 |
| 3,610,585 | 10/1971 | MacLeod | 259/6 |

FOREIGN PATENT DOCUMENTS

351,127  5/1905  France ............................... 259/192

Primary Examiner—Robert W. Jenkins
Attorney, Agent, or Firm—Blanchard, Flynn, Thiel, Boutell & Tanis

[57] ABSTRACT

A kneading and mixing machine comprising at least two bladed members rotatably mounted within a mixing chamber on parallel shafts. The bladed members have screwlike blades having cam parts lying in a cylindrical surface concentric with the corresponding shaft and which during contra-rotation of the shafts sweep over concentric cylindrical opposing surfaces arranged between the blades of the other bladed member. Each blade member has at least two adjacent, opposite-handed blade sections and the blades have a trianglelike cross section, with the base of the triangle facing the corresponding shaft. The apex opposite the base forming the cam and the sides of the triangle adjacent the base are joined in the opposing faces.

4 Claims, 8 Drawing Figures

KNEADING AND MIXING MACHINE

This is a continuation of application Ser. No. 464,333 filed Apr. 26, 1974, now abandoned.

FIELD OF THE INVENTION

This invention relates to a kneading and mixing machine, with at least two inter-meshing, rotatably-mounted bladed members mounted on parallel shafts within a mixing chamber, which members have screw-like blades, of which cam parts lie in the circumscribing surface of a cylinder concentric with the corresponding shaft and which during rotation of the shafts in opposite senses inter-digitate between the blade ribs of the other bladed member and sweep the opposing surfaces of the cylinder concentric with the other corresponding shaft.

BACKGROUND OF THE INVENTION

From German Pat. No. 646,308 a kneading and mixing machine of the above-mentioned kind is known in which the blades extend along the whole bladed member and have the same inclination and are rectangular in cross-section. This known kneading machine has the disadvantage that it has only a poor drawing-in action on the material to be kneaded or mixed, a poor discharge action and an inefficient mixing action.

The invention sets out to overcome the problem of providing a kneading and mixing machine of the above-mentioned kind, in which the material to be kneaded at the commencement of the kneading process is efficiently drawn-in, and at the end of the kneading process is efficiently discharged, and, during the kneading action is thoroughly mixed.

This problem is solved in accordance with the invention in that each bladed member of at least two adjacent members, has a blade section of opposite hand and the blades have a triangle-like section, the base of the triangle faces the shaft, the apex lies opposite the base and forms a cam and that the sides of the triangle adjacent the base join at the opposed face.

By the combination of the oppositely handed blade sections and the triangle-like blades the kneading material is rapidly drawn in by the blade members and is thoroughly mixed. In spite of the high mixing power of the kneading and mixing machine in accordance with the invention the kneaded material is not excessively heated during the mixing process. The kneading machine discharges the kneaded material equally as efficiently as it is drawn in. Because of the opposite-handed nature of the blade sections at the connecting plane thereof the kneaded material is moved forward as a result of which a particularly intimate mixing is produced. Since the one bladed member with its cam surfaces progressively passes the opposing surfaces of the other bladed member, because of the different peripheral speeds of the surfaces passing one another an additional shearing effect is produced which improves the mixing action. The mixed material is subjected during the mixing process to a high pressure and is forced to pass along the blades in thin layers.

In a preferred embodiment of the invention, it is provided that the blades of the two blade sections at the connecting plane are out of phase in relation to one another. By the phase shift of the blades at this plane the mixed material is taken alternately by the one and the other blade section. By the continual displacement to and fro of the mixed material it is particularly intimately mixed.

A further advantageous embodiment of the invention is provided when the different blade lengths are provided, the longer blades of the blade section projecting into the opposite faces of the other blade section so that a dispersed or scattered connecting surface is produced. The mixing power is still further increased as a result.

BRIEF DESCRIPTION OF THE DRAWINGS

Certain embodiments of kneading and mixing machines in accordance with the invention will now be described, by way of example, with reference to the accompanying diagrammatic drawings, in which.

DETAILED DESCRIPTION

Figure 1:
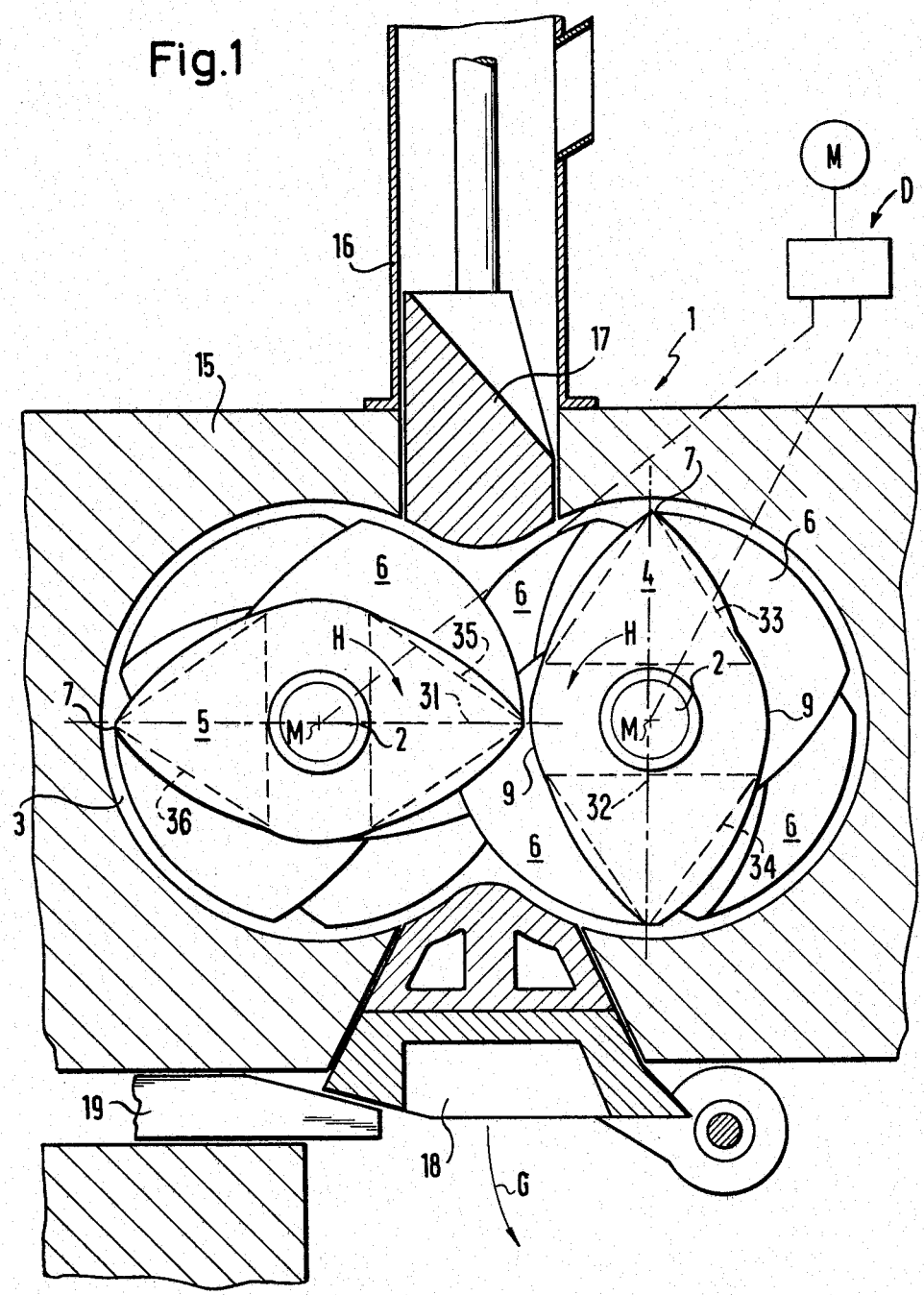
FIG. 1 a cross-section through one embodiment of a kneading and mixing machine in accordance with the invention.

The kneading and mixing machine 1 in accordance with the invention shown in FIG. 1 has two bladed members 4 and 5 inter-meshing and rotatably mounted on parallel shafts 2 within a mixing chamber 3, the members 4 and 5 having screw-like blades 6 which define cams 7.

Figure 2:
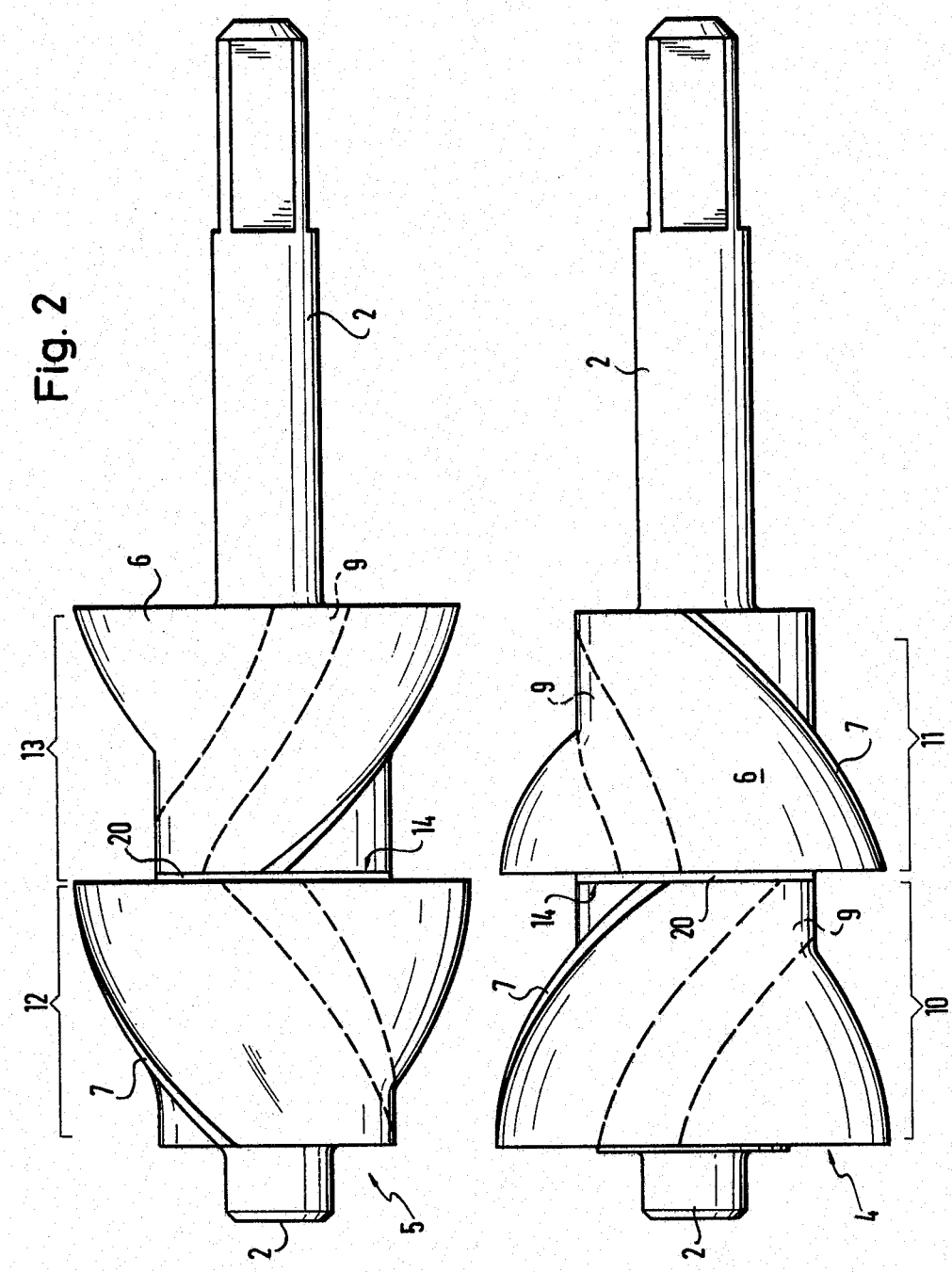
FIG. 2 a side view of bladed members shown in FIG. 1.
Figure 3:
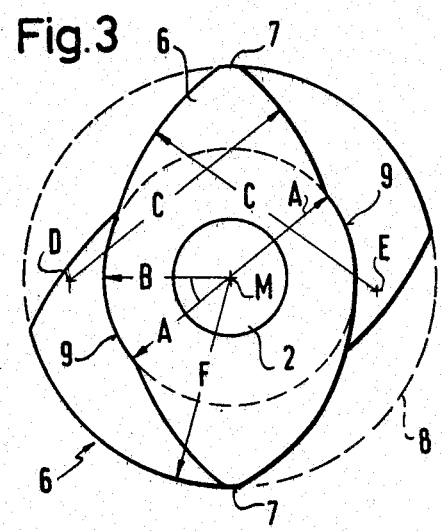
FIG. 3 an end view of a blade of one of the bladed members.

From FIG. 3 it can be readily seen that these cams 7 form parts of the peripheral surface of a bounding cylinder 8 (broken lines) concentric with the shaft 2. They contact during opposite-handed rotation of the shafts 2 a cylindrical opposing surface 9 concentric with the corresponding shaft 2 of the other bladed member. In FIG. 2 these opposing surfaces 9 are indicated in broken lines. It is important to recognize that these follow the twist path of the blades 6.

In FIG. 3 two radial lines A and B are indicated which define a circular arc lying between the two opposing surfaces 9. From this Figure it can also be seen that the blades 6 have a cross-section somewhat like a triangle (see triangles 33, 34, 35, 36 in FIG. 1), the base of the triangle facing the shaft 2, the apex lying opposite to the base forming the cam 7 and the adjacent sides of the triangle joining the opposing surfaces 9. In the embodiment shown the blades have arcuately formed edges which are based on the radius C. The center points of the arcs of the corresponding circles ae indicated in FIG. 3 by D and E.

In the embodiment shown, the two blades are symmetrical to the center of the shaft M and are thus displaced 180° from one another about this shaft. If the circle defined by the radius A or B as indicated in FIG. 3 is divided into an upper and a lower arcuate half it can be said that the arc defined by the radius C and the point E extends from the upper cam 7 to the end of the arc defined by the radius B of the upper arcuate half, while the arc defined by the radius c and the point D is smaller and starting from the cam 7, the arc half intersects before its end, so that between this point of intersection and the end, the arc half defines the opposing surface 9. The blades are radiussed at their transitions to the opposing surfaces 9. In FIG. 3 the imaginary concentric cylinder 8 defined by the radius F is again shown.

As is apparent from FIG. 2 each bladed member 4 or 5 has at least two adjacent blade sections 10 and 11 or 12 and 13 of opposite hand. The blades of the blade sections 10 and 13 are twisted in the manner of a right-handed screw and the blades of the blade sections 11 and 12 are twisted in the manner of a left-handed screw. The blade sections 10 and 13 or 11 and 12 are twisted in the same sense, but, however, as is apparent from FIG. 2 are rotatable in opposite senses.

From FIG. 1 it will be apparent that the blade sections 10 and 12 or 11 and 13 inter-mesh with one another. At the connecting plane 14 of the blade sections the blades of one blade section are out-of-phase in relation to the blades of the other blade section by 90°. In addition, the bladed members 4 and 5 are oriented so that a pair of theoretical planes 31 and 32 (FIG. 1) each contain an axis of a respective bladed member and the apexes of a pair of the 180° spaced triangles 33,34 and 35,36 on each bladed member. Since the bladed members are rotatably driven by the drive arrangement D in opposite directions H, the planes 31 and 32 will be theoretically rotated in synchronization to become inclined 45° to a plane containing both axes of the bladed members. The blade sections of each bladed member are in the embodiment shown separated from one another by a peripheral gap 20.

From FIG. 1 it can be seen that the mixing chamber 3 comprises enclosing semi-shells for the bladed members 4 and 5. The mixing chamber 3 is formed in a housing 15 which also journals the shafts 2. The mixing chamber can be supplied from above through a filling opening 16 in which a feed member 17 is vertically displaceable. Below this feed member at the opposite part of the mixing chamber 3 there is a closure member 18 which can be pivoted outwardly in the direction of the arrow G, which with the aid of a wedge-like member 19 can be held in a position to close the mixing chamber.

OPERATION

During operation of the kneading and mixing machine in accordance with the invention, the following processes take place. When the feed member 17 is in its upper position the material to be kneaded and mixed is supplied through the filling opening 16. The feed member 17 then falls and presses the material into the mixing chamber 3. The inter-meshing, bladed members 4, 5 are driven by a motor M through a drive arrangement D to rotate in the direction of the arrows H, draw the material in and knead it. The oppositely-configured blades work as a displacer. The mix material is thus alternately placed under high pressure and then forced into thin layers which move along the blades. By the use of these blades the mix material is passed to the mixing chamber center or to the connecting plane 14 of the blade sections. Because of the change of the hand of the blades in the region of the connecting plane, the mix material is compressed or forced from one blade section to the other and thereby is very intimately mixed and kneaded. An additional mixing effect arises because the cammed blades engage a different peripheral speeds and the mix material is thus ground between them.

Research has established that the kneading and mixing machine in accordance with the invention requires in comparison with known kneading and mixing machines up to 25% less mixing time and up to 35% smaller energy requirement in order to produce an adequate and sufficient mixing and kneading effect.

Figure 6:
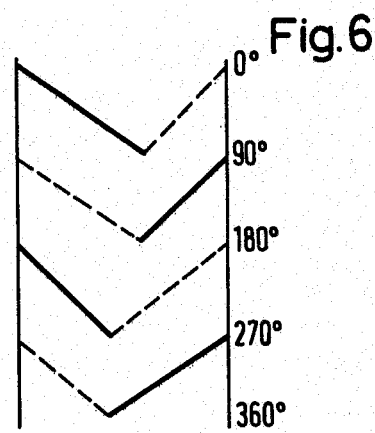
FIGS. 4 to 8 show various developed views of bladed members in accordance with the invention.
Figure 4:
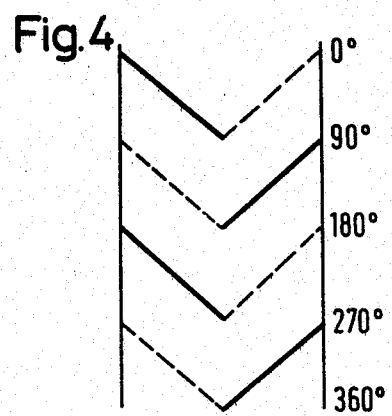
Figure 7:
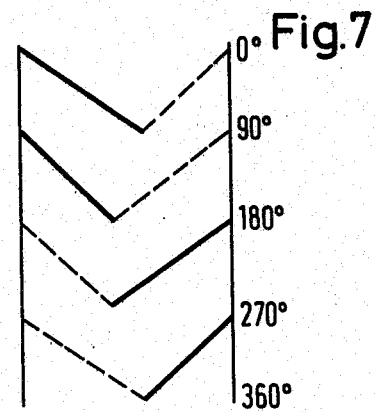
Figure 5:
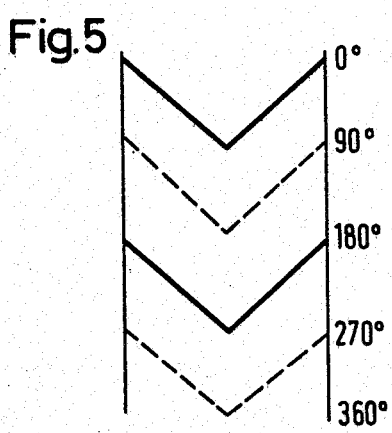
Figure 8:
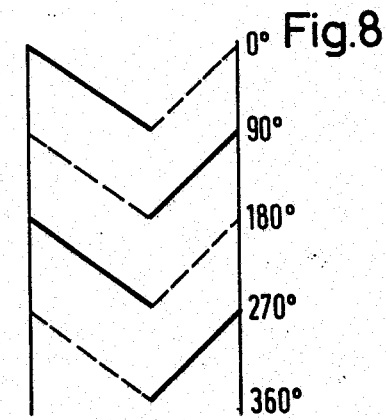

In FIGS. 4 to 8 developed views are shown of various blade bodies in accordance with the invention. In FIG. 4, the blade member 4 illustrated in FIG. 2 is indicated in thick lines while the broken lines indicate a developed view of the blade member 5. In FIG. 5 a developed view of bladed members is shown in which the blades are not displaced in relation to one another at the connecting plane. In the embodiments of FIGS. 6 and 7 blades of various lengths are provided and in the case of FIG. 7 the blade sections are displaced in relation to one another by 90°. In both embodiments there is a different connecting plane. In FIG. 8 an embodiment is illustrated where the blade sections are not of equal length.

In place of twin blade sections, multiple blade sections may be used. The blades can, in contrast to the form shown also have concave walls. In the kneading and mixing machine in accordance with the invention the use of several blade sections as also several bladed members can be considered and is feasible.

I claim:
1. A kneading and mixing machine, comprising:
a housing in the form of parallel intersecting cylinders of equal diameter;
a pair of radially interengaging rotors of equal diameter and each being mounted to rotate within one of said cylinders for effecting an overall movement of material in said cylinders in a direction parallel to the axes of said cylinders, said rotors being 90° out of phase and rotatable about spaced axes extending parallel to the axes of said cylinders, the spacing between said axes being less than twice the radius of one of said rotors;
means for rotating said rotors in opposite directions and at the same speed;
each of said rotors having a shaft portion and at least first and second axially adjacent, axially threadlike extending opposite-handed blade sections mounted on said shaft portion, each of said first and second blade sections including a pair of 180° spaced blades on said shaft portion, each blade having a trianglelike cross section with the base of said trianglelike blade being adjacent said shaft portion, the apex of said trianglelike blade being opposite said base and forming a cam surface and the sides of said trianglelike blade adjacent said base being joined to a surface of said shaft portion, said blades in each of said axially adjacent second blade sections being separated by a peripheral gap and angularly offset 90° relative to the blades in said first blade sections at a connecting plane perpendicular to the axis of said rotors; and
one of said rotors having a first plane containing the axis of rotation thereof and the apexes of said pair of 180° spaced trianglelike blades in either one of said first and second blade sections mounted thereon, the other of said rotors having a second plane containing the axis of rotation thereof and the apexes of said pair of 180° spaced trianglelike blades in the corresponding laterally spaced one of said first and second blade sections mounted thereon, said first and second planes in a coplanar cross section through said pair of rotors perpendicular to the axes of rotation thereof being parallel when inclined 45° to a plane containing the axes of both of said rotors.

2. A kneading and mixing machine according to claim 1, wherein said blades have varying lengths, the longer blades of one blade section being slightly spaced from said surface of said rotor of the other blade section so that a scattered line of intersection is produced.

3. A kneading and mixing machine according to claim 1, wherein said blades have in cross-section arcuate walls.

4. A kneading and mixing machine according to claim 1, wherein said blades at the transition of the blades to the surface on each rotor are radiussed.

* * * * *